US012412291B2

(12) United States Patent
Kim et al.

(10) Patent No.: US 12,412,291 B2
(45) Date of Patent: Sep. 9, 2025

(54) VANISHING POINT DETERMINATION, SYMMETRY-BASED BOUNDARY REFINEMENT, AND COMPONENT DETECTION FOR VEHICLE OBJECT DETECTION OR OTHER APPLICATIONS

(71) Applicant: Canoo Technologies Inc., Torrance, CA (US)

(72) Inventors: Dae Jin Kim, Rancho Palos Verdes, CA (US); David R. Arft, Torrance, CA (US); Jongmoo Choi, Gardena, CA (US)

(73) Assignee: CANOO TECHNOLOGIES INC., Torrence, CA (US)

( * ) Notice: Subject to any disclaimer, the term of this patent is extended or adjusted under 35 U.S.C. 154(b) by 80 days.

(21) Appl. No.: 17/819,583

(22) Filed: Aug. 12, 2022

(65) Prior Publication Data

US 2023/0097780 A1 Mar. 30, 2023

Related U.S. Application Data

(60) Provisional application No. 63/249,732, filed on Sep. 29, 2021.

(51) Int. Cl.
*G06T 7/536* (2017.01)
*B60W 10/18* (2012.01)
(Continued)

(52) U.S. Cl.
CPC ............. *G06T 7/536* (2017.01); *B60W 10/18* (2013.01); *B60W 10/20* (2013.01); *B60W 50/14* (2013.01);
(Continued)

(58) Field of Classification Search
CPC ......... G06V 10/25; G06T 7/536; B60W 10/20
(Continued)

(56) References Cited

U.S. PATENT DOCUMENTS 10,549,694 B2 2/2020 Murad et al.
2006/0212215 A1 9/2006 Koulinitch
(Continued)

OTHER PUBLICATIONS

International Search Report and Written Opinion of the International Searching Authority dated Jan. 18, 2023, in connection with International Application No. PCT/US2022/074939, 31 pages.
(Continued)

*Primary Examiner* — Todd Melton
*Assistant Examiner* — Vincent Feng
(74) *Attorney, Agent, or Firm* — ALLEN, DYER, DOPPELT, GILCHRIST, P.A. Attorneys at Law

(57) ABSTRACT

A method includes obtaining, using at least one processing device, image data associated with a scene. The method also includes identifying, using the at least one processing device, multiple line segments based on the image data. The method further includes identifying, using the at least one processing device, one or more boundaries around one or more objects detected in the image data. In addition, the method includes estimating, using the at least one processing device, a position of a vanishing point associated with the image data based on multiple collections of the line segments while excluding, from the multiple collections, one or more of the line segments that overlap with or that are included within the one or more boundaries.

27 Claims, 11 Drawing Sheets

(51) Int. Cl.
  *B60W 10/20* (2006.01)
  *B60W 50/00* (2006.01)
  *B60W 50/14* (2020.01)
  *B60W 50/16* (2020.01)
  *B60W 60/00* (2020.01)
  *G06T 7/68* (2017.01)
  *G06T 7/73* (2017.01)
  *G06V 20/56* (2022.01)
  *G06V 20/58* (2022.01)
  *G06V 20/62* (2022.01)

(52) U.S. Cl.
  CPC .............. *B60W 50/16* (2013.01); *G06T 7/68* (2017.01); *G06T 7/73* (2017.01); *G06V 20/56* (2022.01); *G06V 20/58* (2022.01); *G06V 20/625* (2022.01); *B60W 2050/0004* (2013.01); *B60W 2050/143* (2013.01); *B60W 2050/146* (2013.01); *B60W 60/001* (2020.02); *B60W 2420/403* (2013.01); *B60W 2552/50* (2020.02); *B60W 2554/20* (2020.02); *B60W 2710/18* (2013.01); *B60W 2710/20* (2013.01); *B60W 2720/10* (2013.01); *B60W 2720/106* (2013.01); *G06T 2207/30252* (2013.01)

(58) Field of Classification Search
  USPC .......................................................... 701/28
  See application file for complete search history.

(56) References Cited

U.S. PATENT DOCUMENTS

| | | |
|---|---|---|
| 2010/0097455 A1 | 4/2010 | Zhang et al. |
| 2013/0266175 A1 | 10/2013 | Zhang et al. |
| 2014/0314279 A1 | 10/2014 | Zhang et al. |
| 2015/0063709 A1 | 3/2015 | Wang et al. |
| 2016/0014406 A1* | 1/2016 | Takahashi ............. G06V 10/34 348/148 |
| 2019/0026905 A1 | 1/2019 | Siegemund et al. |
| 2019/0197693 A1 | 6/2019 | Zagaynov et al. |
| 2020/0226805 A1 | 7/2020 | Szeliski et al. |
| 2020/0334476 A1 | 10/2020 | Wang et al. |
| 2021/0142497 A1 | 5/2021 | Pugh et al. |
| 2021/0217203 A1 | 7/2021 | Kim et al. |
| 2021/0406679 A1 | 12/2021 | Wen et al. |

OTHER PUBLICATIONS

Kong et al., "Vanishing point detection for road detection", IEEE Conference on Computer Vision and Pattern Recognition, Jun. 2009, 9 pages.

Ozgunalp et al., "Multiple Lane Detection Algorithm Based on Novel Dense Vanishing Point Estimation", IEEE Transactions on Intelligent Transportation, vol. 18, No. 3, Mar. 2017, 12 pages.

Kim et al., "Vanishing Point Determination, Symmetry-Based Boundary Refinement, and Component Detection for Vehicle Object Detection or Other Applications", U.S. Appl. No. 17/819,584, filed Aug. 12, 2022, 51 pages.

Kim et al., "Vanishing Point Determination, Symmetry-Based Boundary Refinement, and Component Detection for Vehicle Object Detection or Other Applications", U.S. Appl. No. 17/819,587, filed Aug. 12, 2022, 51 pages.

Non-final Office Action dated Sep. 23, 2024, in connection with U.S. Appl. No. 17/819,584, 18 pages.

* cited by examiner

VANISHING POINT DETERMINATION, SYMMETRY-BASED BOUNDARY REFINEMENT, AND COMPONENT DETECTION FOR VEHICLE OBJECT DETECTION OR OTHER APPLICATIONS

CROSS-REFERENCE TO RELATED APPLICATION AND PRIORITY CLAIM

This application claims priority under 35 U.S.C. § 119(e) to U.S. Provisional Patent Application No. 63/249,732 filed on Sep. 29, 2021. This provisional application is hereby incorporated by reference in its entirety.

TECHNICAL FIELD

This disclosure relates generally to object detection systems. More specifically, this disclosure relates to vanishing point determination, symmetry-based boundary refinement, and component detection for vehicle object detection or other applications.

BACKGROUND

Identifying nearby, moving, or other objects in a scene is often an important or useful function in many autonomous applications, such as in vehicles supporting advanced driving assist system (ADAS) or autonomous driving (AD) features, or other applications. Performing accurate object detection often involves the use of complex computer vision algorithms or complex deep neural networks. Unfortunately, these algorithms tend to require larger amounts of computing resources and can generate results more slowly than desired, particularly for automotive applications.

SUMMARY

This disclosure provides vanishing point determination, symmetry-based boundary refinement, and component detection for vehicle object detection or other applications.

In a first embodiment, a method includes obtaining, using at least one processing device, image data associated with a scene. The method also includes identifying, using the at least one processing device, multiple line segments based on the image data. The method further includes identifying, using the at least one processing device, one or more boundaries around one or more objects detected in the image data. In addition, the method includes estimating, using the at least one processing device, a position of a vanishing point associated with the image data based on multiple collections of the line segments while excluding, from the multiple collections, one or more of the line segments that overlap with or that are included within the one or more boundaries.

In a second embodiment, an apparatus includes at least one processing device configured to obtain image data associated with a scene. The at least one processing device is also configured to identify multiple line segments based on the image data. The at least one processing device is further configured to identify one or more boundaries around one or more objects detected in the image data. In addition, the at least one processing device is configured to estimate a position of a vanishing point associated with the image data based on multiple collections of the line segments while excluding, from the multiple collections, one or more of the line segments that overlap with or that are included within the one or more boundaries.

In a third embodiment, a non-transitory machine-readable medium contains instructions that when executed cause at least one processor to obtain image data associated with a scene. The medium also contains instructions that when executed cause the at least one processor to identify multiple line segments based on the image data. The medium further contains instructions that when executed cause the at least one processor to identify one or more boundaries around one or more objects detected in the image data. In addition, the medium contains instructions that when executed cause the at least one processor to estimate a position of a vanishing point associated with the image data based on multiple collections of the line segments while excluding, from the multiple collections, one or more of the line segments that overlap with or that are included within the one or more boundaries.

In a fourth embodiment, a method includes obtaining, using at least one processing device, a vanishing point and a boundary based on image data associated with a scene, where the boundary is associated with a detected object within the scene. The method also includes repeatedly, during multiple iterations and using the at least one processing device, (i) identifying multiple patches within the boundary and (ii) determining a similarity of the image data contained within the multiple patches. The method further includes identifying, using the at least one processing device, a modification to be applied to the boundary based on the identified patches and the determined similarities. In addition, the method includes generating, using the at least one processing device, a refined boundary based on the modification, where the refined boundary identifies a specified portion of the detected object.

In a fifth embodiment, an apparatus includes at least one processing device configured to obtain a vanishing point and a boundary based on image data associated with a scene, where the boundary is associated with a detected object within the scene. The at least one processing device is also configured to repeatedly, during multiple iterations, (i) identify multiple patches within the boundary and (ii) determine a similarity of the image data contained within the multiple patches. The at least one processing device is further configured to identify a modification to be applied to the boundary based on the identified patches and the determined similarities. In addition, the at least one processing device is configured to generate a refined boundary based on the modification, where the refined boundary identifies a specified portion of the detected object.

In a sixth embodiment, a non-transitory machine-readable medium contains instructions that when executed cause at least one processor to obtain a vanishing point and a boundary based on image data associated with a scene, where the boundary is associated with a detected object within the scene. The medium also contains instructions that when executed cause the at least one processor to repeatedly, during multiple iterations, (i) identify multiple patches within the boundary and (ii) determine a similarity of the image data contained within the multiple patches. The medium further contains instructions that when executed cause the at least one processor to identify a modification to be applied to the boundary based on the identified patches and the determined similarities. In addition, the medium contains instructions that when executed cause the at least one processor to generate a refined boundary based on the modification, where the refined boundary identifies a specified portion of the detected object.

In a seventh embodiment, a method includes obtaining, using at least one processing device, a refined boundary identifying a specified portion of a detected object within a scene, where the refined boundary is associated with image data. The method also includes repeatedly, during multiple iterations and using the at least one processing device, (i) identifying multiple regions within the refined boundary and (ii) determining a similarity of the image data contained within the multiple regions. In addition, the method includes identifying, using the at least one processing device, one or more locations of one or more components of the detected object based on the identified regions and the determined similarities.

In an eighth embodiment, an apparatus includes at least one processing device configured to obtain a refined boundary identifying a specified portion of a detected object within a scene, where the refined boundary is associated with image data. The at least one processing device is also configured to repeatedly, during multiple iterations, (i) identify multiple regions within the refined boundary and (ii) determine a similarity of the image data contained within the multiple regions. The at least one processing device is further configured to identify one or more locations of one or more components of the detected object based on the identified regions and the determined similarities.

In a ninth embodiment, a non-transitory machine-readable medium contains instructions that when executed cause at least one processor to obtain a refined boundary identifying a specified portion of a detected object within a scene, where the refined boundary is associated with image data. The medium also contains instructions that when executed cause the at least one processor to repeatedly, during multiple iterations, (i) identify multiple regions within the refined boundary and (ii) determine a similarity of the image data contained within the multiple regions. The medium further contains instructions that when executed cause the at least one processor to identify one or more locations of one or more components of the detected object based on the identified regions and the determined similarities.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
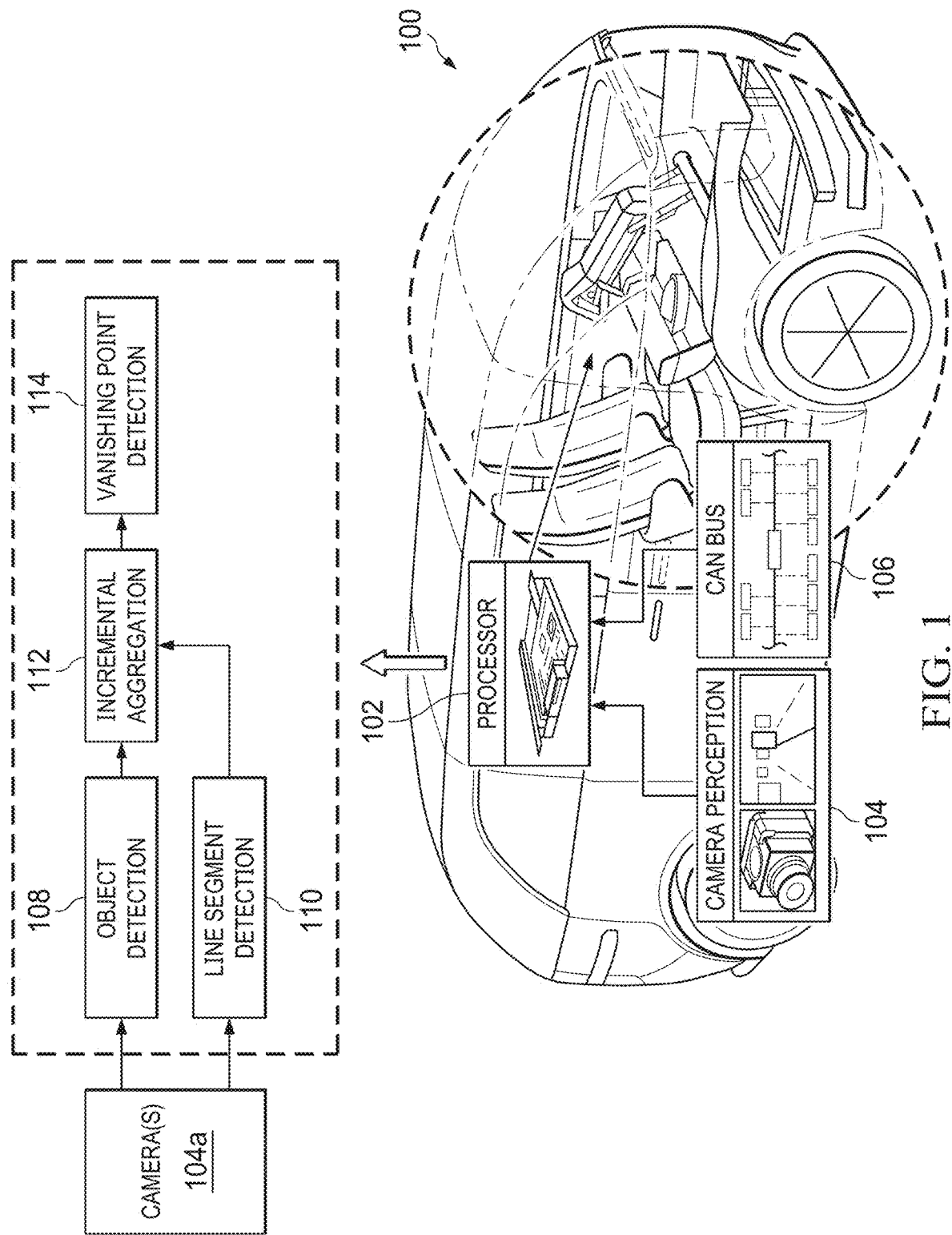
FIG. 1 illustrates an example system supporting vanishing point determination according to this disclosure.

FIGS. 1 through 12, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, identifying nearby, moving, or other objects in a scene is often an important or useful function in many autonomous applications, such as in vehicles supporting advanced driving assist system (ADAS) or autonomous driving (AD) features, or other applications. Performing accurate object detection often involves the use of complex computer vision algorithms or complex deep neural networks. Unfortunately, these algorithms tend to require larger amounts of computing resources and can generate results more slowly than desired, particularly for automotive applications.

In one aspect, this disclosure provides techniques for determining vanishing points in images of scenes associated with a vehicle (often referred to as a target vehicle). As described in more detail below, an image of a scene associated with a target vehicle (such as an image of the scene in front of the target vehicle) can be captured and processed to identify the vanishing point in the image. In an image containing a set of parallel or substantially parallel lines in three-dimensional space (such as lane-marking lines), the lines would form a generally triangular shape in the image plane due to the perspective of a device capturing the image. A vanishing point is defined as the point at which the lines in the set converge within the image plane. The determination of the vanishing point in an image is useful in various image processing applications, such as in algorithms used for line or lane estimation, indirect measurements of vehicle pitching angles, and identification of ego/non-ego lane driving vehicles.

In another aspect, this disclosure provides techniques for performing symmetry-based boundary refinement in order to refine one or more boundaries for one or more objects detected in a scene around a target vehicle. As described in more detail below, once a bounding box or other boundary roughly identifying another vehicle is determined in an image of a scene around a target vehicle, a symmetry-based approach can be used to locate a more-accurate boundary around a portion of the other vehicle (such as around a rear of the other vehicle) based on an expected symmetry of the other vehicle. For example, another vehicle driving ahead of or towards the target vehicle is expected to have a generally-symmetrical shape, which can be used to identify a more-accurate boundary around a portion of the other vehicle in the image. In some cases, to avoid reliance on the other vehicle's specific make/type/model, images may be subjected to no or minimal enhancements (such as only Sobel edge detection or other edge detection) without any pre-trained patch/template matching. The determination of more-accurate vehicle boundaries can be useful in various applications, such as identifying a direction of travel or a change in the direction of travel of the other vehicle relative to the target vehicle or identifying a surface of the other vehicle to be used for depth estimation.

In still another aspect, this disclosure provides techniques for performing component detection in order to identify one or more specific components on the rear portion(s) or other portion(s) of at least one other vehicle in a scene around a target vehicle. As described in more detail below, once the boundary of another vehicle is determined and refined, the image data associated with the other vehicle within the refined boundary can be analyzed to identify one or more regions of the other vehicle associated with one or more specific components of the other vehicle, such as rear taillights or a license plate of the other vehicle. Again, this can be accomplished without prior knowledge of other vehicle's specific make/type/model. This type of information can be useful in various applications, such as identifying a direction of travel or a change in the direction of travel of the other vehicle relative to the target vehicle or identifying a surface of the other vehicle to be used for depth estimation.

In this way, these techniques can be used to identify various information (such as a vanishing point, a symmetry-based boundary, and/or detected vehicle components) that is useful in performing one or more functions, such as one or more ADAS or AD functions. Moreover, this information can be determined using less computing resources and in faster times, which enables use of this information in resource-constrained applications and in real-time applications.

FIG. 1 illustrates an example system 100 supporting vanishing point determination according to this disclosure. In this particular example, the system 100 takes the form of an automotive vehicle, such as an electric vehicle. However, any other suitable system may support vanishing point determination, such as other types of vehicles, autonomous robots, or other autonomous or non-autonomous systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras 104a or other imaging sensors, and the bus 106 represents a controller area network (CAN) bus. However, the processor 102 may interact with any additional sensor(s) and communicate over any other or additional bus(es).

The one or more cameras 104a are configured to generate images of scenes around the system 100. Note that other or additional types of sensors may be used here, such as one or more radio detection and ranging (RADAR) sensors, light detection and ranging (LIDAR) sensors, other types of imaging sensors, or inertial measurement units (IMUs). Measurements or other data from the sensors 104 are used by the processor 102 or other component(s) as described below to perform various functions. In some cases, the sensors 104 may include a single camera 104a, such as one camera positioned on the front of a vehicle. In other cases, the sensors 104 may include multiple cameras 104a, such as one camera positioned on the front of a vehicle, one camera positioned on the rear of the vehicle, and two cameras positioned on opposite sides of the vehicle.

The processor 102 can process the information from the sensors 104 in order to detect objects around or proximate to the system 100, such as one or more vehicles, obstacles, or people near the system 100. The processor 102 can also process the information from the sensors 104 in order to perceive lane-marking lines or other markings on a road, floor, or other surface. The processor 102 can further use various information to generate predictions associated with the system 100, such as to predict the future path(s) of the system 100 or other vehicles, identify a center of a lane in which the system 100 is traveling, or predict the future locations of objects around the system 100.

In this example, the processor 102 performs an object detection function 108, which generally operates to identify objects around the system 100 in a real-time manner based on images or other measurements from the sensor(s) 104. For example, the object detection function 108 can use images from one or more cameras 104a or data from other sensors 104 to identify external objects around the system 100, such as other vehicles moving around or towards the system 100 or pedestrians or objects near the system 100. The object detection function 108 can also identify one or more characteristics of each of one or more detected objects, such as an object class (a type of object) and a boundary around the detected object. The processor 102 may use any suitable technique to identify the objects around the system 100 based on data from the sensor(s) 104. Various techniques for object detection are known in the art, and additional techniques for object detection are sure to be developed in the future. Any of these techniques may be used by the processor 102 here to implement the object detection function 108.

The processor 102 also performs a line segment detection function 110, which generally operates to identify line segments within the images from one or more cameras 104a or the data from other sensors 104. Each detected line segment may generally represent a portion in an image or other sensor data identifying a relatively straight feature. As particular examples, detected line segments may represent portions of lane-marking lines or other markings on a road, floor, or other surface, edges of nearby buildings or other nearby structures; or edges or other features of other objects captured in images or other data. The processor 102 may use any suitable technique to identify line segments based on data from the sensor(s) 104. Various techniques for line segment detection are known in the art, and additional techniques for line segment detection are sure to be developed in the future. Any of these techniques may be used by the processor 102 here to implement the line segment detection function 110.

The processor 102 further performs an incremental aggregation function 112 and a vanishing point detection function 114. The incremental aggregation function 112 generally operates to identify different collections of the line segments detected by the line segment detection function 110 and to estimate a crossing point of the line segments for each collection (which may also involve determination of a residual value). The vanishing point detection function 114 generally operates to calculate a vanishing point for the image based on the determined crossing points, such as by using the residual values as weights during a weighted combination of the crossing points. Example operations that can be performed by the incremental aggregation function 112 and the vanishing point detection function 114 are described below. The final vanishing point determined for a scene may be used in any suitable manner, including in the techniques described below.

Note that the functions 108-114 shown in FIG. 1 and described above may be implemented in any suitable manner in the system 100. For example, in some embodiments, various functions 108-114 may be implemented or supported using one or more software applications or other software instructions that are executed by at least one processor 102. In other embodiments, at least some of the functions 108-114 can be implemented or supported using dedicated hardware components. In general, the functions 108-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-114 described above. This may allow, for instance, the processor(s) 102 to be used to process multiple images and other sensor data in parallel or to perform various operations described in this patent document above and below in parallel.

Although FIG. 1 illustrates one example of a system 100 supporting vanishing point determination, various changes may be made to FIG. 1. For example, various functions and components shown in FIG. 1 may be combined, further subdivided, replicated, omitted, or rearranged and additional functions and components may be added according to particular needs. Also, as noted above, the functionality for vanishing point determination may be used in any other suitable system, and the system may or may not relate to automotive vehicles or other vehicles.

Figure 2:
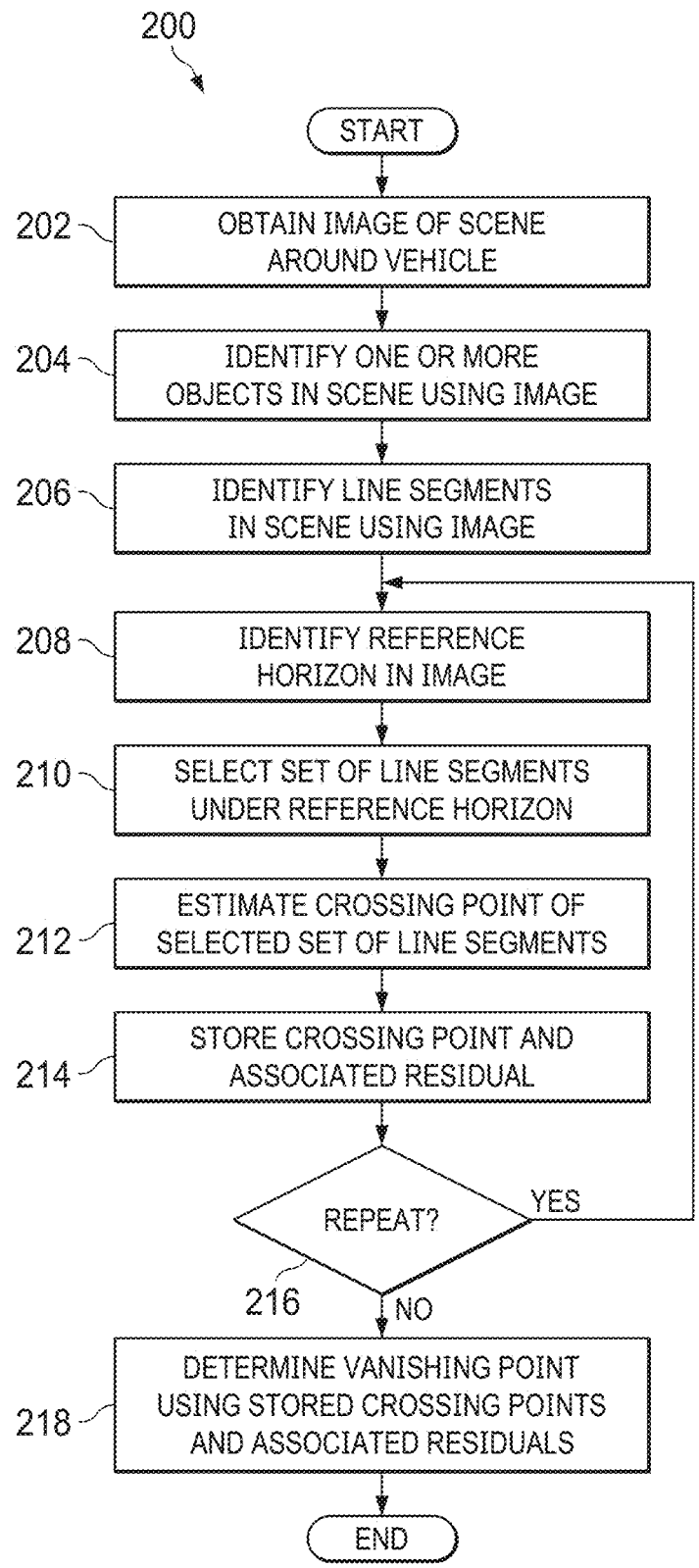
FIG. 2 illustrates an example method for vanishing point determination according to this disclosure.

FIG. 2 illustrates an example method 200 for vanishing point determination according to this disclosure. The method 200 may, for example, be performed using the components of the system 100 shown in FIG. 1. Note, however, that the method 200 may be performed using any other suitable device or system. Also, during the discussion of the method 200, reference is made to FIG. 3, which illustrates an example vanishing point determination according to this disclosure. The example of the determination shown in FIG. 3 is for illustration only and is merely meant to illustrate how various steps in FIG. 2 may be performed.

As shown in FIG. 2, an image of a scene around a vehicle is obtained at step 202. This may include, for example, the processor 102 obtaining at least one image from at least one camera 104a or obtaining other sensor data from at least one other type of sensor 104. One or more objects in the scene are identified using the image at step 204. This may include, for example, the processor 102 performing the object detection function 108 to identify at least one object and a bounding box or other boundary around each object. Line segments in the scene are identified using the image at step 206. This may include, for example, the processor 102 performing the line segment detection function 110 to identify segments of lane-marking lines, other manmade lines, edges of buildings or other structures, or other line segments in the image.

Figure 3:
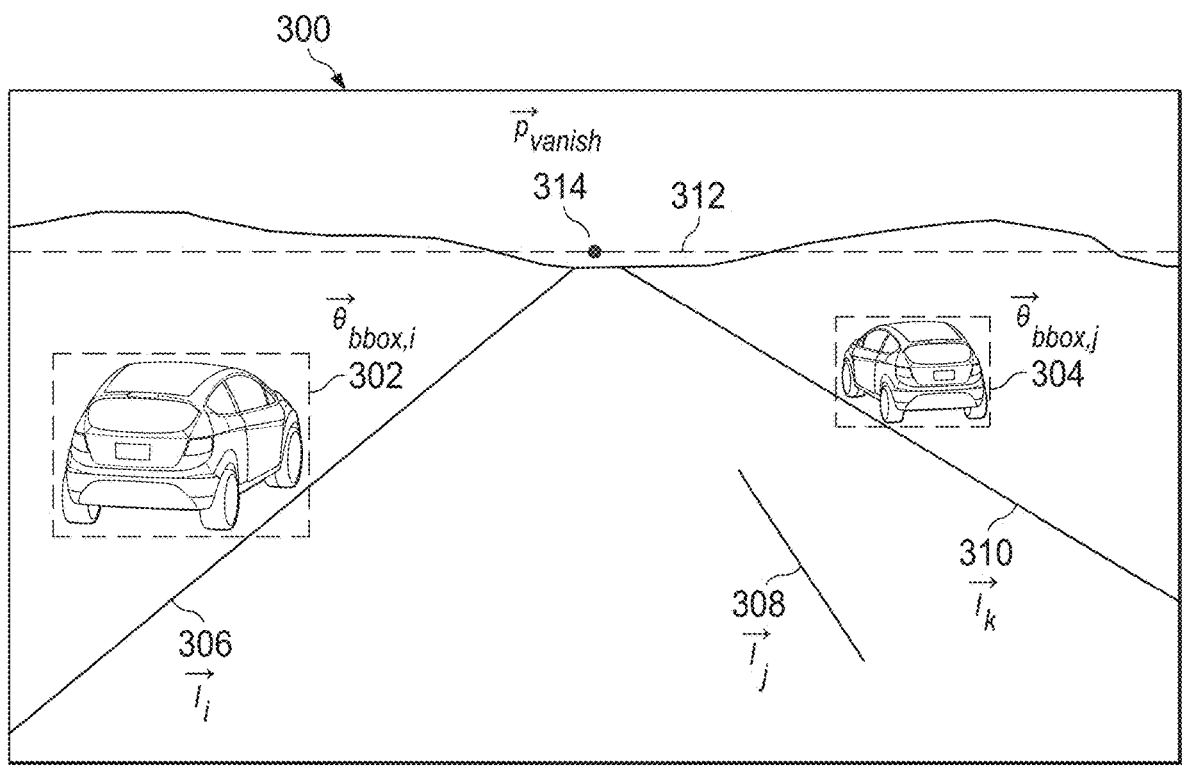
FIG. 3 illustrates an example vanishing point determination according to this disclosure.

An example of this is shown in FIG. 3, where an image 300 is processed to identify two bounding boxes 302, 304 associated with two objects and to identify three line segments 306, 308, 310. Bounding boxes may be referred to below using the notation $\vec{\theta}_{bbox,k}=(x_k, y_k, w_k, h_k)$, where $k=1, \ldots, N$. Here, N refers to the total number of bounding boxes, $(x_\alpha, y_\alpha)$ refers to the coordinates of the pixel at the top left corner of the $k^{th}$ bounding box, and $(w_k, h_k)$ refers to the width and height of the $k^{th}$ bounding box in pixels. Also, line segments may be referred to below using the notation $\vec{l}_\ell$, where $\ell=1, \ldots, M$. Here, M refers to the total number of line segments, and each line segment may be parameterized, such as by using the form $\vec{l}_\ell = ax+by+c$ or by using the form $\vec{l}_\ell = s\vec{p}_A + (1-s)\vec{p}_B$, $s \in [0,1]$.

An iterative process occurs to identify the crossing points for different combinations of the identified line segments. A reference horizon in the image is identified at step 208. This may include, for example, the processor 102 performing the incremental aggregation function 112 to identify a generally horizontal line around the middle of the captured image where it appears the horizon is located. An example of this is shown in FIG. 3, where a line 312 represents an identified reference horizon.

A set of line segments under the reference horizon is selected at step 210. This may include, for example, the processor 102 performing the incremental aggregation function 112 to identify a set of the line segments that are present under the identified reference horizon in the image. In some embodiments, the processor 102 can select a set of L line segments that satisfy the following:

$$S_l = \arg_\ell \{ \vec{l}_\ell \mid \vec{p}_A(y) < h_{ref} \text{ and } \vec{p}_B(y) < h_{ref} \}, \; |S_l| = L \qquad (1)$$

Here, $h_{ref}$ refers to the identified reference horizon, and $\vec{p}_A(y)$ and $\vec{p}_B(y)$ refer to the y-coordinates of the ends of the associated line segment. Also, in some embodiments, one or more bounding boxes can be used to filter or ignore line segments that overlap or that are included within the bounding box(es), which can be done to help prevent noisy estimations. This can be expressed as follows:

$$S_l = \arg_\ell \left\{ \vec{l}_\ell \mid \overline{\vec{p}_A \in \vec{\theta}_{bbox,q}} \text{ and } \overline{\vec{p}_B \in \vec{\theta}_{bbox,q}} \forall \; q=1, \ldots, N \right\}, \; |S_l| = L \qquad (2)$$

Here, $\vec{p} \in \vec{\theta}_{bbox}$ represents a predefined operator to check if a point $\vec{p}$ is contained in a bounding box $\vec{\theta}_{bbox}$.

A crossing point of the line segments in the select set is estimated at step 212. This may include, for example, the processor 102 performing the incremental aggregation function 112 to identify a crossing point for the L line segments in the set using a "least squares" calculation. In some embodiments, the crossing point may be identified in the following manner:

$$a\hat{X} = (A^T A)^{-1} A^T B \qquad (3)$$

where:

$$A = \begin{bmatrix} a_1 & b_1 & c_1 \\ \vdots & \vdots & \vdots \\ a_L & b_L & c_L \end{bmatrix}, X = \begin{bmatrix} x & y & 1 \end{bmatrix}^T, B = \begin{bmatrix} 0 & \ldots & 0 \end{bmatrix}^T \qquad (4)$$

Here, $a_1$-$c_1$ represent a vector of values associated with the first line segment, and $a_L$-$c_L$ represent a vector of values associated with the $L^{th}$ line segment. The least squares calculation or other calculation may identify a crossing point $\vec{p}_{cross} = (\hat{x}, \hat{y})$ and a residual r. The crossing point and its associated residual can be stored at step 214. In some cases, the crossing point and its associated residual can be stored as a pair $S_p \leftarrow \{\vec{p}_{cross}, r\}$ in a cache or other memory of the processor 102 or other suitable storage.

A determination is made whether to repeat another iteration at step 216. This may include, for example, the processor 102 performing the incremental aggregation function 112 to determine whether a user-specified number or other number of estimated crossing points have been identified. If not, the process can return to step 208. Otherwise, a vanishing point is determined using the stored crossing points and residuals at step 218. This may include, for example, the processor 102 performing the vanishing point detection function 114 to calculate the vanishing point for the image using the stored crossing points and residuals. In some embodiments, the vanishing point detection function 114 determines the vanishing point using a weighted combination of the crossing points, where the residuals are used as the weights for the combination. This can be expressed as:

$$\vec{p}_{vanish} = \sum_{k=1,\ldots,K} \tilde{r}_i \cdot \vec{p}_{cross}, \tilde{r}_i = \frac{r_i}{\sum_{j=1,\ldots,K} r_j} \quad (5)$$

Here, K represents the number of crossing points and residuals generated during K iterations of steps 208-214. As shown in FIG. 3, a vanishing point 314 may be identified for the image 300. The identified vanishing point 314 may be used in various ways, including in the techniques described below.

In this way, vanishing point estimation may occur via a progressive aggregation of line segments. This approach can be easily implemented using less-heavy computing resources and/or can be performed in less time. Many of the line segments may be identified using painted lane-marking lines and other painted lines, while other environmental line segments (such as from buildings, road curbs, or urban poles) can also be used. To prevent inconsistent vanishing point estimation, line segments associated with other vehicles may optionally be filtered, such as by ignoring line segments within bounding boxes. Among other things, this approach can avoid using heavy computing resources (which are required by conventional deep neural networks). In some cases, multiple processors 102 and/or multiple cores or engines of the processor(s) 102 can be used to perform different portions of the process described above.

Although FIG. 2 illustrates one example of a method 200 for vanishing point determination, various changes may be made to FIG. 2. For example, while shown as a series of steps, various steps in FIG. 2 may overlap, occur in parallel, occur in a different order, or occur any number of times. Although FIG. 3 illustrates one example of a vanishing point determination, various changes may be made to FIG. 3. For instance, the contents of the image 300 and the results of the vanishing point determination can vary depending on the actual environment around the system 100.

The vanishing point determined for an image as described above may be used in any suitable manner. For example, in some cases, the vanishing point determined for an image may be used to perform symmetry-based boundary refinement as described below. Note, however, that this use of the vanishing point is for illustration only.

Figure 4:
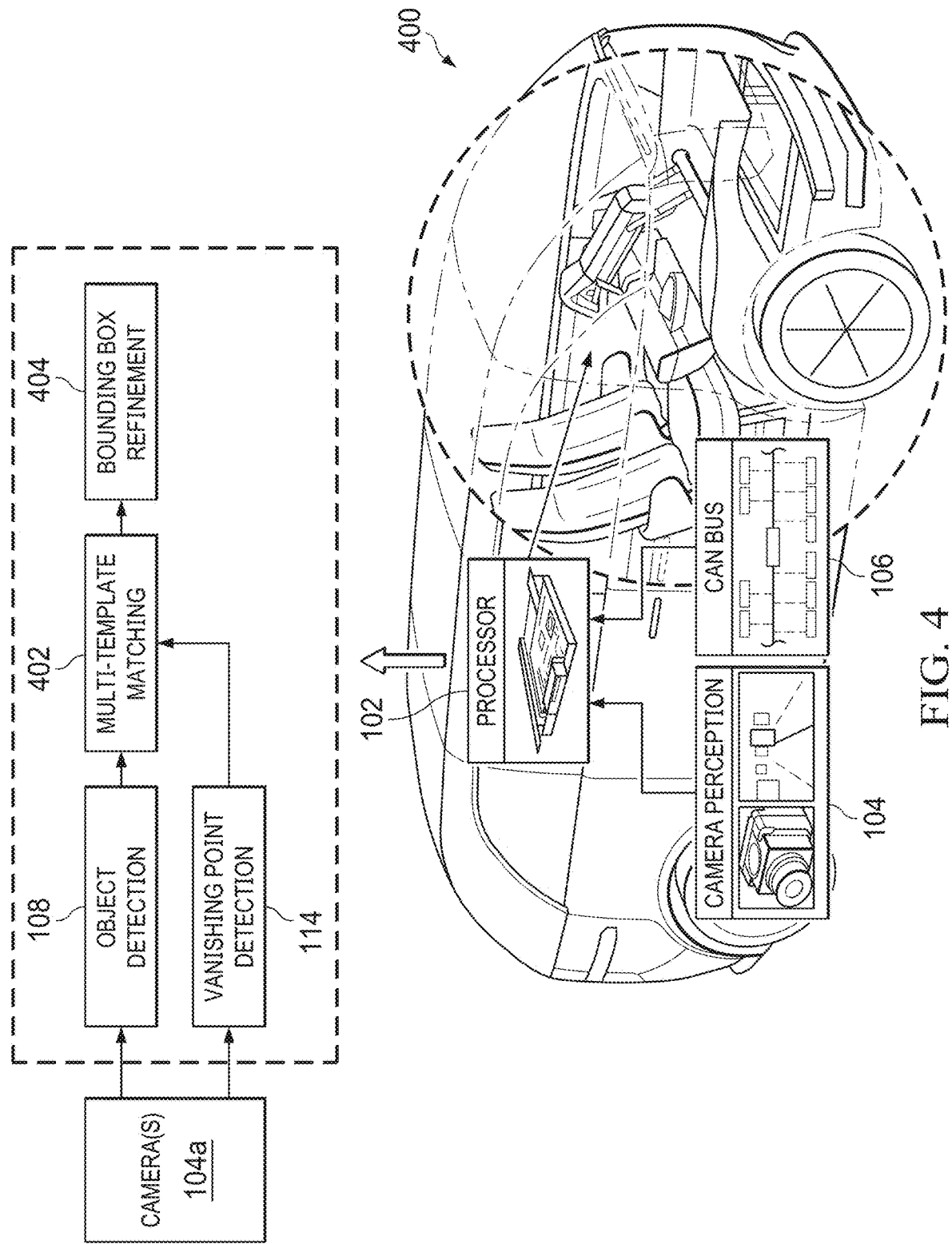
FIG. 4 illustrates an example system supporting symmetry-based boundary refinement according to this disclosure.

FIG. 4 illustrates an example system 400 supporting symmetry-based boundary refinement according to this disclosure. The system 400 here includes many of the same components described above with respect to the system 100, and common reference numbers are used in the systems. As shown in FIG. 4, the processor 102 of FIG. 4 performs the object detection function 108 and the vanishing point detection function 114. Note that the line segment detection function 110 and the incremental aggregation function 112 are omitted from FIG. 4 for clarity but can be performed by the processor 102 of the system 400 in FIG. 4.

The processor 102 in FIG. 4 is configured to perform symmetry-based boundary refinement, which generally involves refining one or more bounding boxes or other boundaries for one or more detected objects to more accurately define the boundary of a specified portion of each detected object (such as a front or rear portion of each detected object). Each original bounding box from the object detection function 108 may be defined using the notation $\vec{\theta}_{bbox,k} = (x_k, y_k, w_k, h_k)$ as described above. Each refined bounding box that is generated as described below may be defined using the notation $\vec{\theta}_{bbox,k} = (x_k, y_k, w_k, h_k, \pi_{l,k}, \pi_{r,k})$, where $(\pi_{l,k}, \pi_{r,k}) \in [0,1]$ are ratio parameters that represent the refined bounding box (such as when $x_k + w_k \cdot \pi_{l,k}$ represents the refined box's left boundary edge). Thus, each refined bounding box has a set of $(\pi_{l,i}, \pi_{r,i})$ ratios that alter the size of the original bounding box.

In this example, the processor 102 performs a multi-template matching function 402 and a bounding box refinement function 404. The multi-template matching function 402 generally operates to analyze each bounding box generated by the object detection function 108 using (among other things) the vanishing point identified by the vanishing point detection function 114. The multi-template matching function 402 uses an expected symmetry of each detected vehicle in an image so that the bounding box refinement function 404 is able to refine the bounding box associated with that detected vehicle. As described in more detail below, the multi-template matching function 402 can analyze different patches on right and left sides of an original bounding box and look for statistically-significant similarities between the patches on the right and left sides of the original bounding box. The similarities between the patches can be used to identify a modification to be applied by the bounding box refinement function 404 to update the original bounding box and generate an updated or refined bounding box. Example operations that can be performed by the multi-template matching function 402 and the bounding box refinement function 404 are described below. One or more refined bounding boxes determined for a scene may be used in any suitable manner, including in the techniques described below.

Note that the functions 402-404 shown in FIG. 4 and described above may be implemented in any suitable manner in the system 400. For example, in some embodiments, various functions 402-404 may be implemented or supported using one or more software applications or other software instructions that are executed by at least one processor 102. In other embodiments, at least some of the functions 402-404 can be implemented or supported using dedicated hardware components. In general, the functions 402-404 described above may be performed using any suitable hardware or any suitable combination of hardware and software/firmware instructions.

Although FIG. 4 illustrates one example of a system 400 supporting symmetry-based boundary refinement, various changes may be made to FIG. 4. For example, various functions and components shown in FIG. 4 may be combined, further subdivided, replicated, omitted, or rearranged and additional functions and components may be added according to particular needs. Also, as noted above, the functionality for symmetry-based boundary refinement may be used in any other suitable system, and the system may or may not relate to automotive vehicles or other vehicles.

Figure 5:
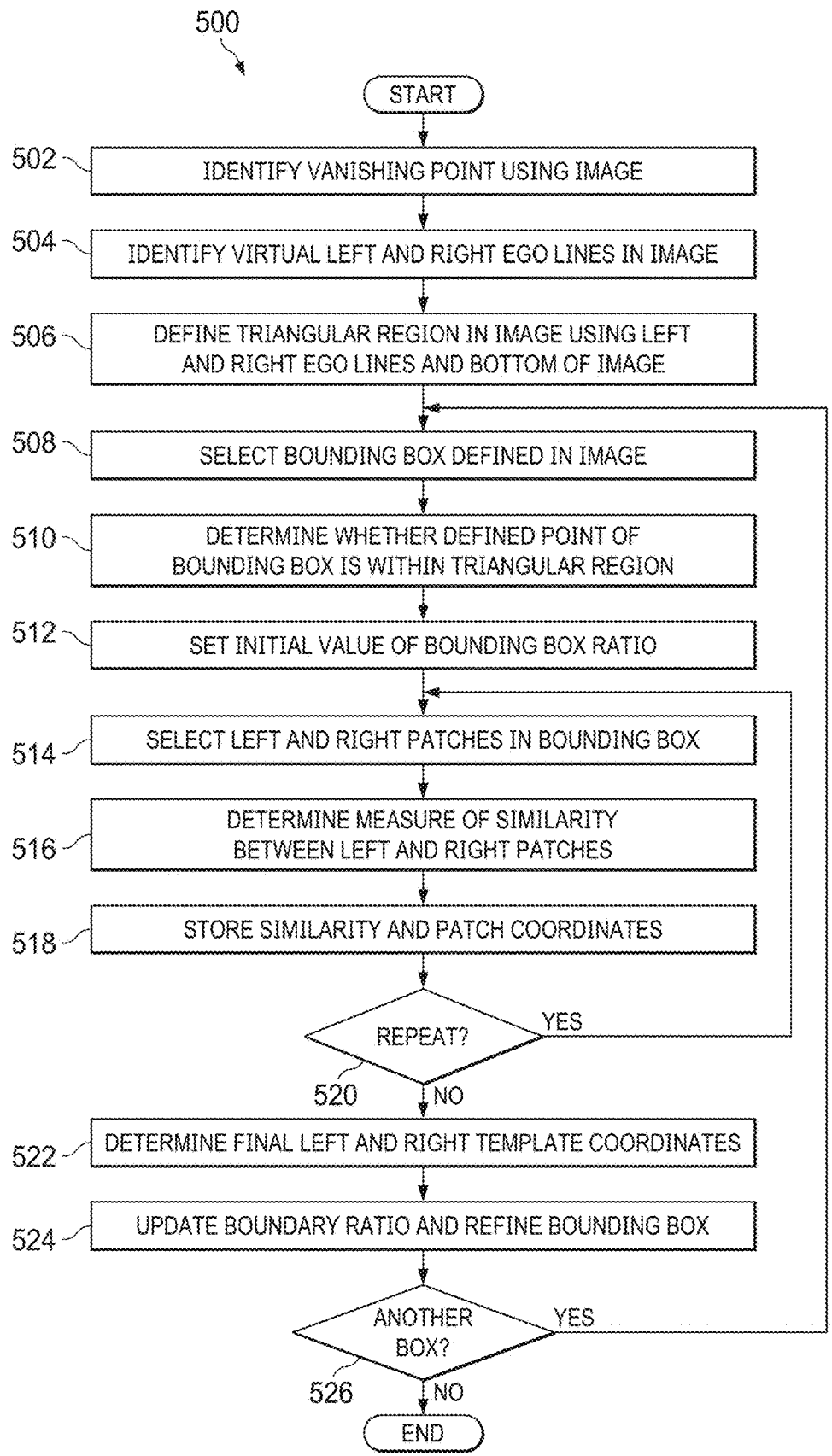
FIG. 5 illustrates an example method for symmetry-based boundary refinement according to this disclosure.
Figure 6:
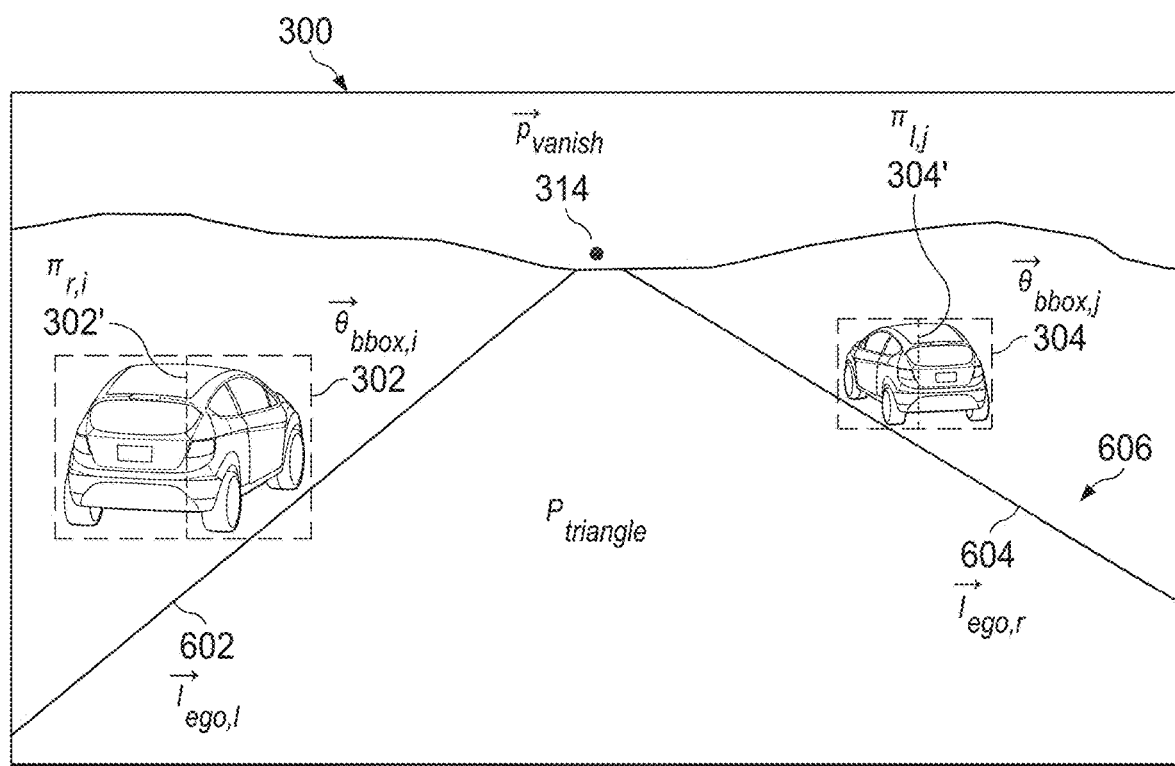
FIG. 6 illustrates an example symmetry-based boundary refinement according to this disclosure.

FIG. 5 illustrates an example method 500 for symmetry-based boundary refinement according to this disclosure. The method 500 may, for example, be performed using the components of the system 400 shown in FIG. 4. Note, however, that the method 500 may be performed using any other suitable device or system. Also, during the discussion of the method 500, reference is made to FIG. 6, which illustrates an example symmetry-based boundary refinement according to this disclosure. The example of the refinement shown in FIG. 6 is for illustration only and is merely meant to illustrate how various steps in FIG. 5 may be performed.

As shown in FIG. 5, a vanishing point is identified using an image at step 502. This may include, for example, the processor 102 performing the process shown in FIG. 2 to identify a vanishing point $\vec{p}_{vanish}=(x, y)$, which can define the x and y coordinates of the determined vanishing point in the image. Left and right virtual ego lines are identified in the image at step 504. This may include, for example, the processor 102 estimating a left virtual ego line $\vec{l}_{ego,l}$ as passing through the determined vanishing point and through the bottom right corner of a bounding box around a nearby vehicle and estimating a right virtual ego line $\vec{l}_{ego,r}$ as passing through the determined vanishing point and through the bottom left corner of a bounding box around another nearby vehicle. In some cases, the left virtual ego line can be described as follows:

$$\vec{l}_{ego,l} = a_l x + b_l y + c_l \quad (6)$$

A similar equation may be used for the right virtual ego line. An example of this is shown in FIG. 6, where the image 300 is processed to identify a left virtual ego line 602 and a right virtual ego line 604. The left and right virtual ego lines and the bottom of the image are used to define a triangular region within the image at step 506. An example of this is shown in FIG. 6, where the image 300 includes a triangular region 606. The identified triangular region may be denoted $P_{triangle}$.

A bounding box defined for the image is selected at step 508. This may include, for example, the processor 102 performing the multi-template matching function 402 to select one of the bounding boxes generated by the object detection function 108. A determination is made whether a defined point of the selected bounding box is inside or outside of the triangular region at step 510. For convenience, the bottom center point $\vec{p}_{cb}$ of the selected bounding box may be used as the defined point, although other points along the selected bounding box may be used as the defined point. This may include, for example, the processor 102 performing the multi-template matching function 402 to determine whether the defined point of the selected bounding box is inside the triangular region, to the left of the triangular region, or to the right of the triangular region. In some embodiments, the processor 102 may perform the following to make this determination:

$$\vec{p}_{cb} \subset P_{triangle} = \begin{cases} \text{if } \vec{p}_{cb}(y) + \frac{a_l}{b_l}\vec{p}_{cb}(x) < \frac{c_l}{b_l}, & \text{'left'} \\ \text{if } \vec{p}_{cb}(y) + \frac{a_r}{b_r}\vec{p}_{cb}(x) < \frac{c_r}{b_r}, & \text{'right'} \\ \text{else,} & \text{'center'} \end{cases} \quad (7)$$

Here, an object is determined to be within the triangular region (center) or outside the triangular region (left or right). Bounding boxes for objects within the triangular region may be excluded from further processing, while bounding boxes for objects to the left and right of the triangular region may be processed further for refinement.

Assuming the selected bounding box is outside the triangular region, an initial value for the bounding box ratio is defined at step 512. This may include, for example, the processor 102 performing the multi-template matching function 402 to define the initial bounding box ratio. In some cases, initial bounding box ratio values for a bounding box may be defined as:

$$\tilde{\pi}_{l,i} = k_l \frac{\vec{p}_{cb}(x) - \vec{p}'_{cb,l}(x)}{\vec{p}_{rc}(x) - \vec{p}'_{cb,l}(x)} + (1 - k_l)\frac{\vec{p}_{cb}(y) - \vec{p}_{vanish}(y)}{\vec{p}_{rc}(y) - \vec{p}_{vanish}(y)}, k_l \in [0,1] \quad (8)$$

$$\tilde{\pi}_{r,i} = k_r \frac{\vec{p}'_{cb,r}(x) - \vec{p}_{cb}(x)}{\vec{p}_{rc}(x) - \vec{p}'_{cb,r}(x)} + (1 - k_r)\frac{\vec{p}_{cb}(y) - \vec{p}_{vanish}(y)}{\vec{p}_{rc}(y) - \vec{p}_{vanish}(y)}, k_r \in [0,1] \quad (9)$$

where:

$$\vec{p}'_{cb,l} = (-\frac{b_l}{a_l}\vec{p}_{cb}(x) + \frac{c_l}{a_l}, \vec{p}_{cb}(y)) \quad (10)$$

$$\vec{p}'_{cb,r} = (-\frac{b_r}{a_r}\vec{p}_{cb}(x) + \frac{c_r}{a_r}, \vec{p}_{cb}(y)) \quad (11)$$

An iterative process occurs to identify and analyze patches from the selected bounding box. Left and right patches in the selected bounding box are selected at step 514. This may include, for example, the processor 102 performing the multi-template matching function 402 to select a patch of the selected bounding box in a left portion of the selected bounding box and to select a patch of the selected bounding box in a right portion of the selected bounding box. A first of the patches here may be selected randomly, in a predefined manner, or in any other suitable manner, and a second of the patches may be a mirror image of the first patch. In some embodiments, the processor 102 may select a rectangular-shaped patch $\vec{\theta}_{tpl,k}=(x_k, y_k, w_k, h_k)$ from the left edge of the selected bounding box (meaning $x_k=x_i+w_i\cdot\tilde{\pi}_{l,i}$) and select a mirrored patch $\vec{\theta}'_{tpl,k}$ from the residual portion up to the right edge of the selected bounding box (meaning $x_k+w_k=x_i+w_i\cdot(1-\tilde{\pi}_{r,i})$).

A measure of similarity between the left and right patches is identified at step 516. This may include, for example, the processor 102 performing the multi-template matching function 402 to calculate the visual similarity of the image data in the left and right patches. In some embodiments, the similarity can be calculated as a mathematical correlation, such as in the following manner:

$$s_k, \vec{p}_{match,k}=f(\vec{\theta}_{tpl,k}, \vec{\theta}'_{tpl,k}) \quad (12)$$

Here, $s_k$ denotes the visual similarity between the two patches. The similarity and the patch coordinates (which can be said to represent template coordinates) can be stored at step 518. This may include, for example, the processor 102 storing a tuple of {visual similarity $s_k$, left template coordinates $\vec{p}_{left-tpl}=g(\vec{p}_{match,k}, \vec{\theta}_{tpl,k})$, right template coordinates $\vec{p}_{right-tpl}=h(\vec{p}_{match,k}, \vec{\theta}'_{tpl,k})\}$. This may be expressed as follows:

$$S_s \leftarrow \{s_k, \vec{p}_{left-tpl}, \vec{p}_{right-tpl}\} \quad (13)$$

A determination is made whether to repeat another iteration at step 520. This may include, for example, the processor 102 determining whether a user-specified number or other number of estimated similarities and template coordinates have been identified. If not, the process can return to step 514. Otherwise, finalized left and right template coordinates are identified at step 522. This may include, for example, the processor 102 performing the multi-template matching function 402 to calculate the finalized left and right template coordinates using the stored template coordinates and visual similarities. In some embodiments, the multi-template matching function 402 determines the finalized left and right template coordinates as a weighted combination of the stored left and right template coordinates, where the visual similarities are used as the weights for the combination. This can be expressed as:

$$\bar{\vec{p}}_{left-tpl} = \sum\nolimits_{k=1,\ldots,K} \tilde{s}_k \cdot \vec{p}_{left-tpl}, \tilde{s}_k = \frac{s_k}{\sum\nolimits_{j=1,\ldots,K} s_j} \quad (14)$$

$$\bar{\vec{p}}_{right-tpl} = \sum\nolimits_{k=1,\ldots,K} \tilde{s}_k \cdot \vec{p}_{right-tpl}, \tilde{s}_k = \frac{s_k}{\sum\nolimits_{j=1,\ldots,K} s_j} \quad (15)$$

The boundary ratio for the selected bounding box is updated and used to refine the selected bounding box at step 524. This may include, for example, the processor 102 performing the multi-template matching function 402 to update the boundary ratio. In some embodiments, this can be expressed as follows:

$$\tilde{\pi}_{l,i} = \frac{\bar{\vec{p}}_{left-tpl} - x_i}{w_i} \quad (16)$$

$$\tilde{\pi}_{l,i} = \frac{x_i + w_i - \bar{\vec{p}}_{right-tpl}}{w_i} \quad (17)$$

This may also include the processor 102 performing the bounding box refinement function 404 to modify the current selected bounding box based on the updated boundary ratio. For instance, the processor 102 can refine the selected boundary box so that it has the updated boundary ratios within the image.

A determination is made whether one or more additional bounding boxes need to be processed at step 526. If so, the process can return to step 508 to select and refine another bounding box. Otherwise, the process can end, and the refined bounding box(es) can be used in any suitable manner.

Example results obtained using the process are shown in FIG. 6, where the bounding box 302 is refined to a bounding box 302' and the bounding box 304 is refined to a bounding box 304'. The bounding box 302' here more accurately defines the boundary of the rear portion of one vehicle, and the bounding box 304' here more accurately defines the boundary of the rear portion of another vehicle. Essentially, the bounding box 302' identifies a generally symmetrical portion of the left vehicle, and the bounding box 304' identifies a generally symmetrical portion of the right vehicle. The ability to accurately identify the rear portions of nearby vehicles may be used in various ways, such as to identify a direction of travel or a change in the direction of travel of the left or right vehicle or to identify a surface of another vehicle to be used for depth estimation.

Although FIG. 5 illustrates one example of a method 500 for symmetry-based boundary refinement, various changes may be made to FIG. 5. For example, while shown as a series of steps, various steps in FIG. 5 may overlap, occur in parallel, occur in a different order, or occur any number of times. Although FIG. 6 illustrates one example of a symmetry-based boundary refinement, various changes may be made to FIG. 6. For instance, the contents of the image 600 and the results of the symmetry-based boundary refinement can vary depending on the actual environment around the system 100.

The refined bounding boxes or other boundaries determined for an image as described above may be used in any suitable manner. For example, in some cases, the refined bounding boxes determined for an image may be used to perform component detection as described below. Note, however, that this use of the refined bounding boxes is for illustration only.

Figure 7:
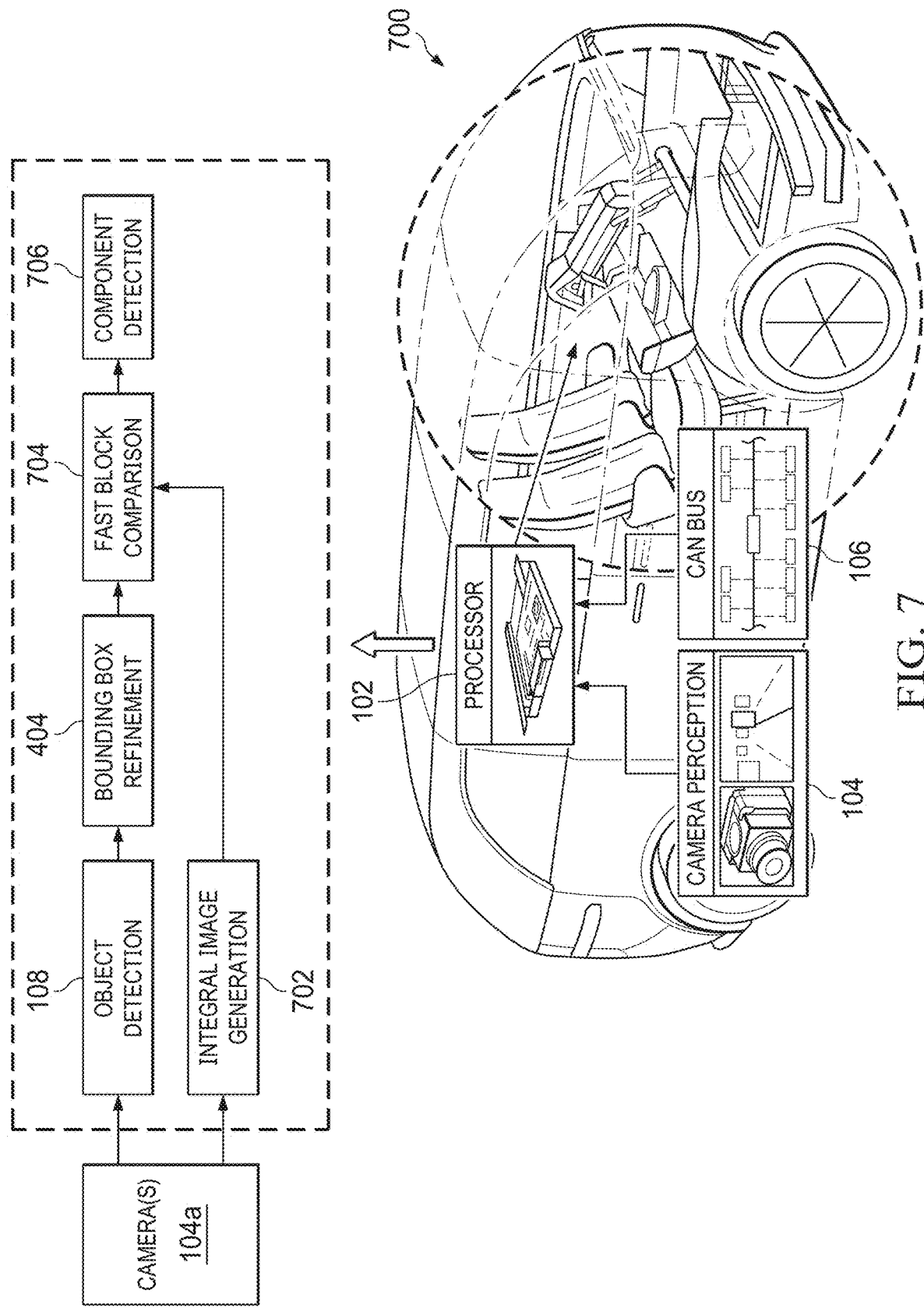
FIG. 7 illustrates an example system supporting component detection according to this disclosure.

FIG. 7 illustrates an example system 700 supporting component detection according to this disclosure. The system 700 here includes many of the same components described above with respect to the systems 100 and 400, and common reference numbers are used in the systems. As shown in FIG. 7, the processor 102 of FIG. 7 performs the object detection function 108 and the bounding box refinement function 404. Note that the line segment detection function 110, incremental aggregation function 112, vanishing point detection function 114, and multi-template matching function 402 are omitted from FIG. 7 for clarity but can be performed by the processor 102 of the system 700 in FIG. 7.

The processor 102 in FIG. 7 is configured to perform component detection in which one or more individual components of other vehicles (such as license plates or taillights) are identified. Here, the processor 102 performs an integral image generation function 702, which generally operates to produce an integral image using the image from a camera 104a. In some embodiments, an integral image $I(\bullet,\bullet)$ can be generated as follows:

$$I(x,y)=\Sigma_{x'\leq x, y'\leq y}i(x',y') \quad (18)$$

$$I(x,y)=i(x,y)+I(x-1,y)+I(x,y-1)-I(x-1,y-1) \quad (19)$$

where:

$$I(x',y')=0, x', y'<0 \quad (20)$$

The integral image from the integral image generation function 702 and one or more refined bounding boxes from the bounding box refinement function 404 are provided to a fast block comparison function 704. The fast block comparison function 704 generally operates to select different (mirrored) regions within each refined bounding box and analyze the regions to compute probabilistic similarities between the regions, which can be based on the integral image. As described in more detail below, the fast block comparison function 704 can analyze different mirrored regions of a refined bounding box and look for regions that are probabilistically similar. The similarities between the regions can be used by a component detection function 706 to identify regions in the refined bounding box associated with one or more specific components of a vehicle. Example operations that can be performed by the fast block comparison function 704 and the component detection function 706 are described below. One or more identified vehicle components may be used in any suitable manner.

Note that the functions 702-706 shown in FIG. 7 and described above may be implemented in any suitable manner in the system 700. For example, in some embodiments, various functions 702-706 may be implemented or supported using one or more software applications or other software instructions that are executed by at least one processor 102. In other embodiments, at least some of the functions 702-706 can be implemented or supported using dedicated hardware components. In general, the functions 702-706 described above may be performed using any suitable hardware or any suitable combination of hardware and software/firmware instructions.

Although FIG. 7 illustrates one example of a system 700 supporting component detection, various changes may be made to FIG. 7. For example, various functions and components shown in FIG. 7 may be combined, further subdivided, replicated, omitted, or rearranged and additional functions and components may be added according to particular needs. Also, as noted above, the functionality for component detection may be used in any other suitable system, and the system may or may not relate to automotive vehicles or other vehicles.

Figure 8:
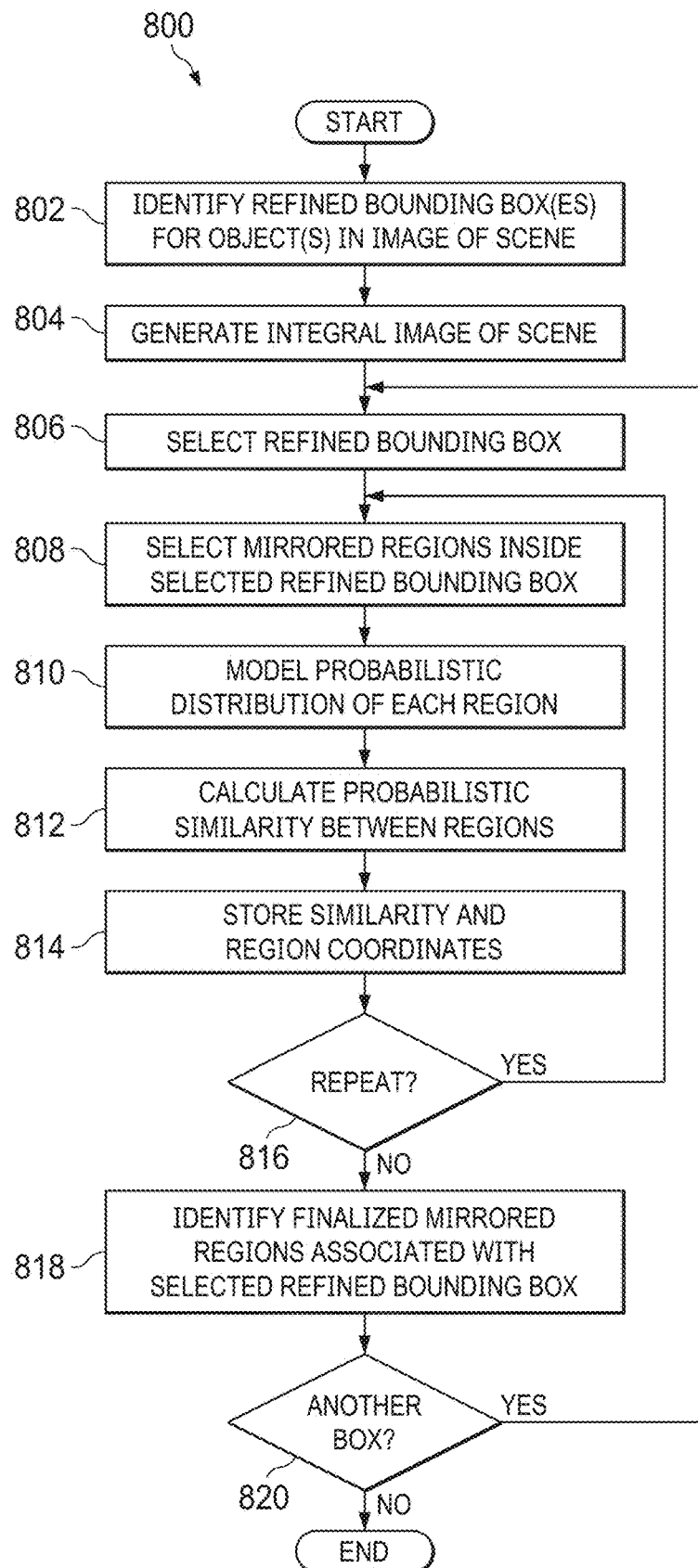
FIG. 8 illustrates an example method for component detection according to this disclosure.
Figure 9:
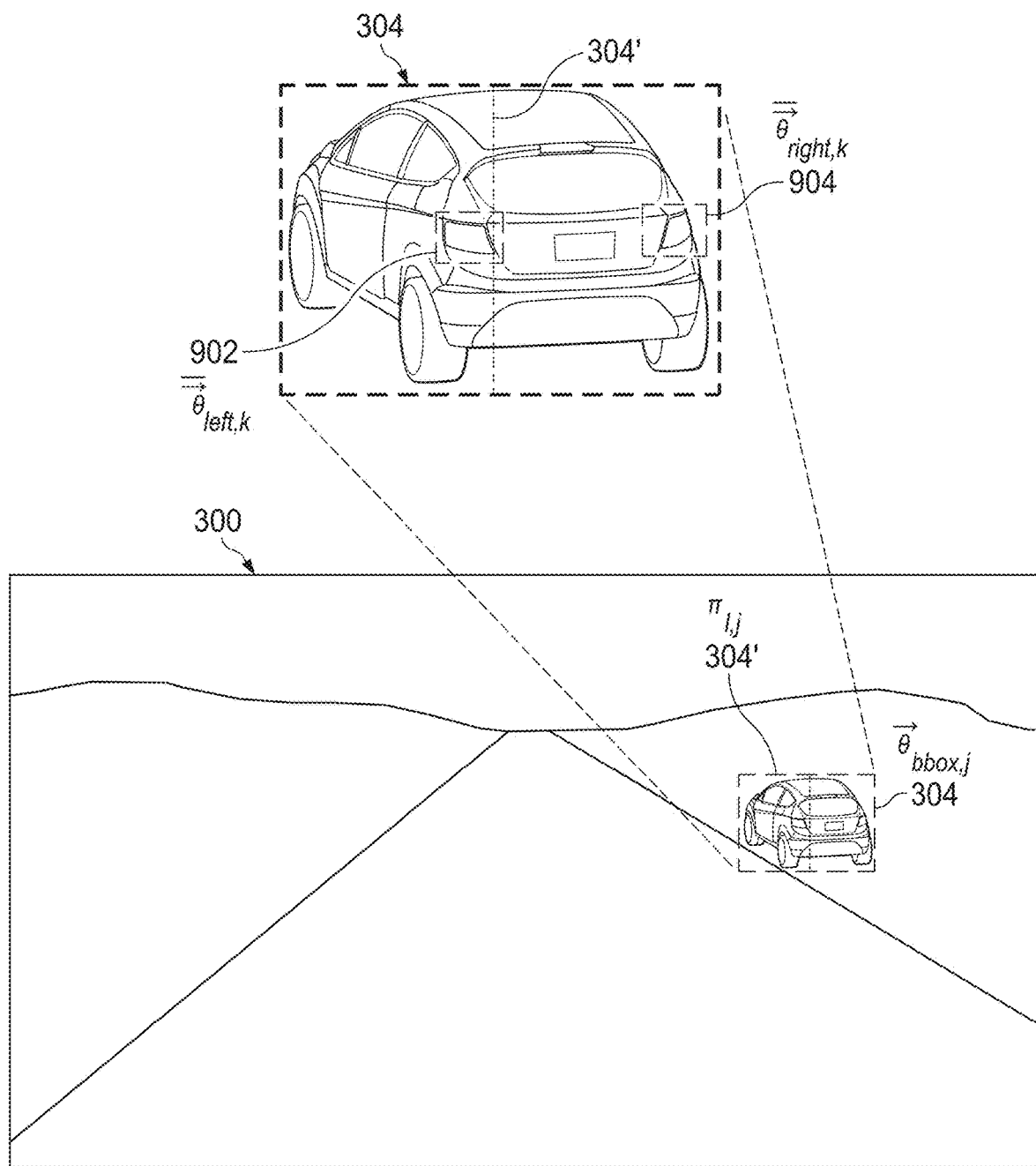
FIG. 9 illustrates an example component detection according to this disclosure.

FIG. 8 illustrates an example method 800 for component detection according to this disclosure. The method 800 may, for example, be performed using the components of the system 700 shown in FIG. 7. Note, however, that the method 800 may be performed using any other suitable device or system. Also, during the discussion of the method 800, reference is made to FIG. 9, which illustrates an example component detection according to this disclosure. The example of the detection shown in FIG. 9 is for illustration only and is merely meant to illustrate how various steps in FIG. 8 may be performed.

As shown in FIG. 8, one or more refined bounding boxes for one or more objects in an image are identified at step 802. This may include, for example, the processor 102 performing the process shown in FIG. 2 to identify a vanishing point and performing the process shown in FIG. 5 to generate the refined bounding box(es). An integral image of a scene is generated at step 804. This may include, for example, processor 102 generating the integral image as described above.

A refined bounding box is selected at step 806. This may include, for example, the processor 102 performing the fast block comparison function 704 to select one of the refined bounding boxes generated by the bounding box refinement function 404. Mirrored regions in the selected refined bounding box are selected at step 808. This may include, for example, the processor 102 performing the fast block comparison function 704 to select mirrored regions in the selected refined bounding box randomly, in a predefined manner, or in any other suitable manner. In some embodiments, the processor 102 may select a rectangular-shaped region $\vec{\theta}_{left,k}=(x_k, y_k, w_k, h_k)$ inside the selected refined boundary box and another rectangular region $\vec{\theta}_{right,k}$ inside the selected refined boundary box (but mirrored against a middle line of the refined boundary box).

A probabilistic distribution of each region is modeled at step 810. This may include, for example, the processor 102 performing the fast block comparison function 704 to model the probabilistic distribution of each rectangular region or other defined region. For simplicity, a normal distribution parameterization $\mathcal{N}_{\cdot,k} \sim (\mu_k, \sigma_k)$ may be selected, where a mean $\mu_k$ and a standard deviation $\sigma_k$ are computed using the integral image I and $I'(\cdot,\cdot) = \Sigma_{x' \leq x, y' \leq y} i(x', y')^2$. This can be expressed as:

$$\mu_k = \frac{I(\vec{\theta}_{\cdot,k})}{N_k}, \sigma_k = \sqrt{\frac{I'(\vec{\theta}_{\cdot,k}) - \frac{I(\vec{\theta}_{\cdot,k})^2}{N_k}}{N_k}} \quad (21)$$

Here, $N_k$ represents a number of pixels in a region $I(\vec{\theta}_{\cdot,k})$.

A probabilistic similarity between the two regions is determined at step 812. This may include, for example, the processor 102 performing the fast block comparison function 704 to calculate the probabilistic similarity between the distributions of the two regions calculated in step 810. In some embodiments, the probabilistic similarity between two rectangular regions can be determined via their normal distribution forms $\mathcal{N}_{left}, \mathcal{N}_{right}$. In particular embodiments, a variant of the Kullback-Leibler divergence (KLD), referred to as the Jenson Shannon divergence (JSD), may be used to overcome the asymmetry associated with KLD. In these embodiments, the probabilistic similarity may be determined as follows:

$$D_{JS,k} = \frac{D_{KL,k}(\mathcal{N}_{left} \| \mathcal{N}_{right}) + D_{KL,k}(\mathcal{N}_{right} \| \mathcal{N}_{left})}{2} \quad (22)$$

where:

$$D_{KL,k}(\mathcal{N}_{left} \| \mathcal{N}_{right}) = \log \frac{\sigma_{right}}{\sigma_{left}} + \frac{\sigma_{left}^2 + (\mu_{left} - \mu_{right}^2)}{2 * \sigma_{right}^2} - \frac{1}{2} \quad (23)$$

Note, however, that other measures of probabilistic similarity may be used here. The probabilistic similarity and the coordinates of the two regions can be stored at step 814. This may include, for example, the processor 102 storing a tuple of {JSD value $D_{JS,k}$, left rectangular region $\vec{\theta}_{left,k}$, right rectangular region $\vec{\theta}_{right,k}$}. This may be expressed as follows:

$$S_p \leftarrow \{D_{JS,k}, \vec{\theta}_{left,k}, \vec{\theta}_{right,k}\} \quad (24)$$

A determination is made whether to repeat another iteration at step 816. This may include, for example, the processor 102 determining whether a user-specified number or other number of estimated similarities and regions have been identified. If not, the process can return to step 808. Otherwise, finalized mirrored regions associated with the selected refined bounding box are identified at step 818. This may include, for example, the processor 102 performing the component detection function 706 to determine the finalized mirrored regions using the stored region coordinates and probabilistic similarities. In some embodiments, the component detection function 706 determines the finalized mirrored regions as a weighted combination of the stored region coordinates, where the probabilistic similarities are used as the weights for the combination. This can be expressed as:

$$\bar{\theta}_{\mathit{left},k} = \sum\nolimits_{k=1,\ldots,K} \vec{\theta}_{\mathit{left},k} \cdot \tilde{D}_{JS,k}, \tilde{D}_{JS,k} = \frac{D_{JS,k}}{\sum_{j=1,\ldots,K} D_{JS,j}} \quad (25)$$

$$\bar{\theta}_{\mathit{right},k} = \sum\nolimits_{k=1,\ldots,K} \vec{\theta}_{\mathit{right},k} \cdot \tilde{D}_{JS,k}, \tilde{D}_{JS,k} = \frac{D_{JS,k}}{\sum_{j=1,\ldots,K} D_{JS,j}} \quad (26)$$

A determination is made whether one or more additional bounding boxes need to be processed at step 820. If so, the process can return to step 806 to select and refine another bounding box. Otherwise, the process can end, and the identified vehicle component(s) can be used in any suitable manner.

An example of this is shown in FIG. 9, where the image 300 is processed to identify two regions 902 and 904 within the refined bounding box 304'. As can be seen here, the processor 102 has identified the two regions 902 and 904 of the image 300 associated with the taillights of another vehicle since, based on the process described above, these two regions 902 and 904 in the refined bounding box 304' are probabilistically similar. The same type of process may be used, for example, to identify two regions containing the license plate of the other vehicle. The positions of these components of the other vehicle may be used for various purposes, such as identifying a direction of travel or a change in the direction of travel of the other vehicle relative to the target vehicle or identifying a surface of the other vehicle to be used for depth estimation.

Although FIG. 8 illustrates one example of a method 800 for component detection, various changes may be made to FIG. 8. For example, while shown as a series of steps, various steps in FIG. 8 may overlap, occur in parallel, occur in a different order, or occur any number of times. Although FIG. 9 illustrates one example of a component detection, various changes may be made to FIG. 9. For instance, the contents of the image 900 and the results of the component detection can vary depending on the actual environment around the system 100.

Figure 10:
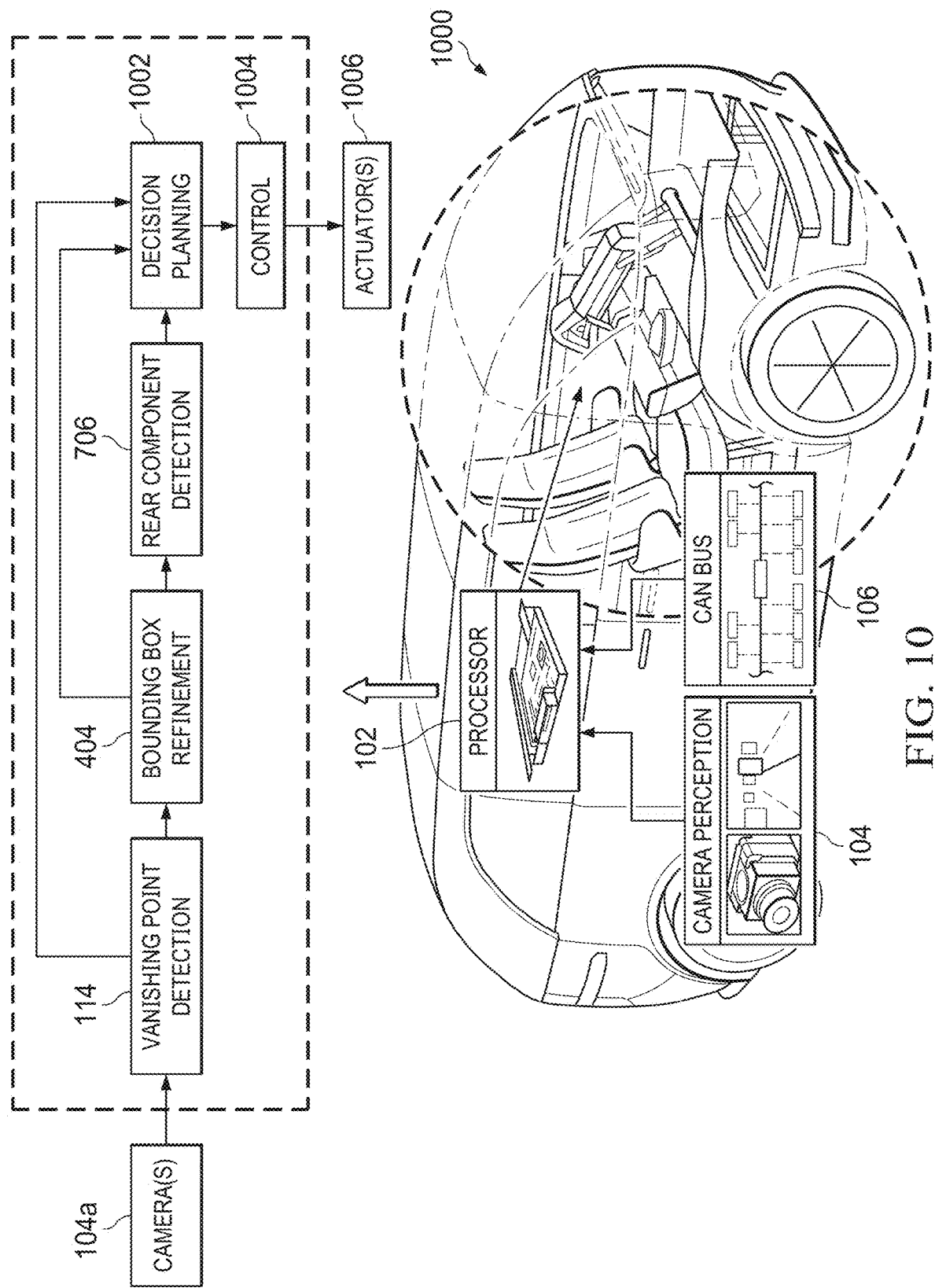
FIG. 10 illustrates an example usage of vanishing point determination, symmetry-based boundary refinement, and/or component detection according to this disclosure.

FIG. 10 illustrates an example usage of vanishing point determination, symmetry-based boundary refinement, and/or component detection according to this disclosure. A system 1000 here includes many of the same components described above with respect to the systems 1000, 400, and 700, and common reference numbers are used in the systems. As shown in FIG. 10, the processor 102 of FIG. 10 performs the vanishing point detection function 114, the bounding box refinement function 404, and the component detection function 706. Note that the other functions described above are omitted from FIG. 10 for clarity but can be performed by the processor 102 of the system 1000 in FIG. 10.

The processor 102 performs a decision planning function 1002, which generally uses one or more determined vanishing points, one or more refined bounding boxes, and/or one or more identified vehicle components to determine how to adjust the operation of the system 1000. For example, in an automotive vehicle, the decision planning function 1002 may determine whether (and how) to change the steering direction of the vehicle, whether (and how) to apply the brakes or accelerate the vehicle, or whether (and how) to trigger an audible, visible, haptic, or other warning. The warning may indicate that the system 1000 is near another vehicle, obstacle, or person, is departing from a current lane in which the vehicle is traveling, or is approaching a possible impact location with another vehicle, obstacle, or person. In general, the identified adjustments determined by the decision planning function 1002 can vary widely based on the specific application.

The decision planning function 1002 can interact with one or more control functions 1004, each of which can be used to adjust or control the operation of one or more actuators 1006 in the system 1000. For example, in an automotive vehicle, the one or more actuators 1006 may represent one or more brakes, electric motors, or steering components of the vehicle, and the control function(s) 1004 can be used to apply or discontinue application of the brakes, speed up or slow down the electric motors, or change the steering direction of the vehicle. In general, the specific way(s) in which detected objects can be used may vary depending on the specific system 1000 in which object detection is being used.

Note that the functions 1002-1006 shown in FIG. 10 and described above may be implemented in any suitable manner in the system 100. For example, in some embodiments, various functions 1002-1006 may be implemented or supported using one or more software applications or other software instructions that are executed by at least one processor 102. In other embodiments, at least some of the functions 1002-1006 can be implemented or supported using dedicated hardware components. In general, the functions 1002-1006 described above may be performed using any suitable hardware or any suitable combination of hardware and software/firmware instructions.

Although FIG. 10 illustrates one example usage of vanishing point determination, symmetry-based boundary refinement, and/or component detection, various changes may be made to FIG. 10. For example, various functions and components shown in FIG. 10 may be combined, further subdivided, replicated, omitted, or rearranged and additional functions and components may be added according to particular needs. Also, while vanishing point determination, symmetry-based boundary refinement, and component detection are used here, the system 1000 may use a single one of these functions or any desired combination of these functions.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 11:
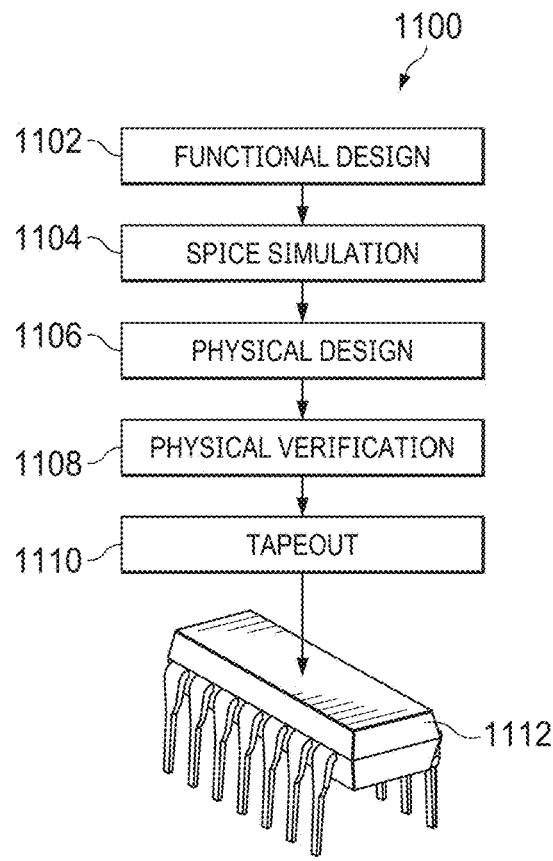
FIG. 11 illustrates an example design flow for employing one or more tools to design hardware that implements one or more control functions according to this disclosure.

FIG. 11 illustrates an example design flow 1100 for employing one or more tools to design hardware that implements one or more control functions according to this disclosure. More specifically, the design flow 1100 here represents a simplified ASIC design flow employing one or more EDA tools or other tools for designing and facilitating fabrication of ASICs that implement at least some functional aspects of the various embodiments described above.

As shown in FIG. 11, a functional design of an ASIC is created at step 1102. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 1104. This may include, for example, using the SPICE simulations or other simulations to verify that the functional design of the ASIC performs as expected.

A physical design of the ASIC is created based on the validated data structures and other aspects of the functional design at step 1106. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 1108. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 1110. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 1112.

Although FIG. 11 illustrates one example of a design flow 1100 for employing one or more tools to design hardware that implements one or more vehicle control functions, various changes may be made to FIG. 11. For example, at least some functional aspects of the various embodiments described above may be implemented in any other suitable manner.

Figure 12:
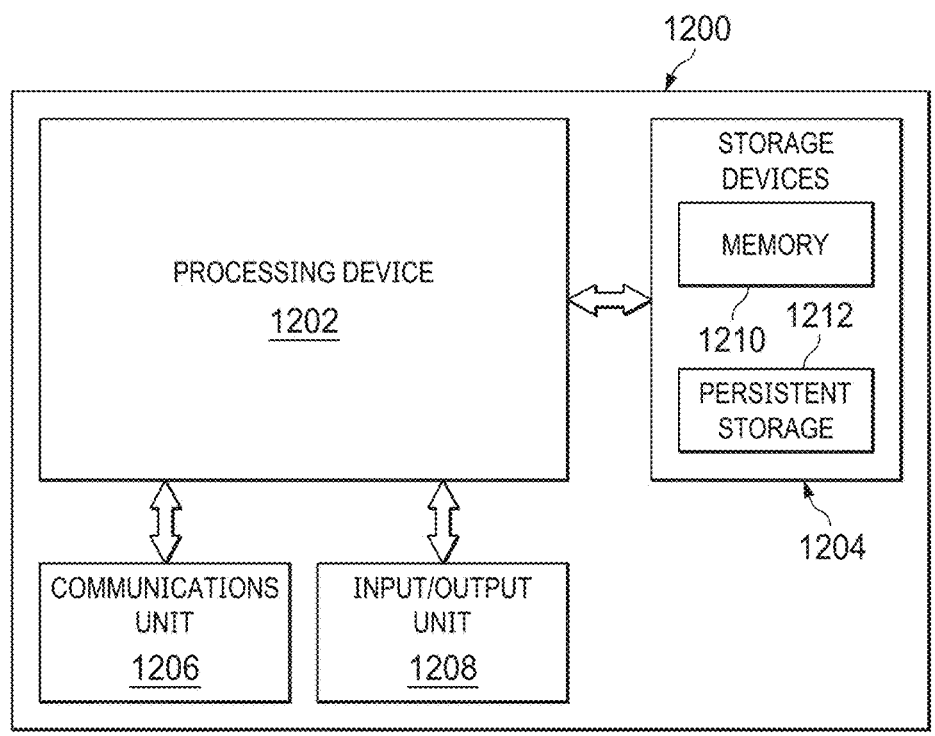
FIG. 12 illustrates an example device supporting execution of one or more tools to design hardware that implements one or more control functions according to this disclosure.

FIG. 12 illustrates an example device 1200 supporting execution of one or more tools to design hardware that implements one or more vehicle control functions according to this disclosure. The device 1200 may, for example, be used to implement at least part of the design flow 1100 shown in FIG. 11. However, the design flow 1100 may be implemented in any other suitable manner.

As shown in FIG. 12, the device 1200 denotes a computing device or system that includes at least one processing device 1202, at least one storage device 1204, at least one communications unit 1206, and at least one input/output (I/O) unit 1208. The processing device 1202 may execute instructions that can be loaded into a memory 1210. The processing device 1202 includes any suitable number(s) and type(s) of processors or other processing devices in any suitable arrangement. Example types of processing devices 1202 include one or more microprocessors, microcontrollers, digital signal processors (DSPs), application specific integrated circuits (ASICs), field programmable gate arrays (FPGAs), or discrete circuitry.

The memory 1210 and a persistent storage 1212 are examples of storage devices 1204, which represent any structure(s) capable of storing and facilitating retrieval of information (such as data, program code, and/or other suitable information on a temporary or permanent basis). The memory 1210 may represent a random access memory or any other suitable volatile or non-volatile storage device(s). The persistent storage 1212 may contain one or more components or devices supporting longer-term storage of data, such as a read only memory, hard drive, Flash memory, or optical disc.

The communications unit 1206 supports communications with other systems or devices. For example, the communications unit 1206 can include a network interface card or a wireless transceiver facilitating communications over a wired or wireless network. The communications unit 1206 may support communications through any suitable physical or wireless communication link(s).

The I/O unit 1208 allows for input and output of data. For example, the I/O unit 1208 may provide a connection for user input through a keyboard, mouse, keypad, touchscreen, or other suitable input device. The I/O unit 1208 may also send output to a display or other suitable output device. Note, however, that the I/O unit 1208 may be omitted if the device 1200 does not require local I/O, such as when the device 1200 represents a server or other device that can be accessed remotely.

The instructions that are executed by the processing device 1202 include instructions that implement at least part of the design flow 1100. For example, the instructions that are executed by the processing device 1202 may cause the processing device 1202 to generate or otherwise obtain functional designs, perform simulations, generate physical designs, verify physical designs, perform tape-outs, or create/use photomasks (or any combination of these functions). As a result, the instructions that are executed by the processing device 1202 support the design and fabrication of ASIC devices or other devices that implement one or more vehicle control functions described above.

Although FIG. 12 illustrates one example of a device 1200 supporting execution of one or more tools to design hardware that implements one or more vehicle control functions, various changes may be made to FIG. 12. For example, computing and communication devices and systems come in a wide variety of configurations, and FIG. 12 does not limit this disclosure to any particular computing or communication device or system.

Note that while the various functions described above are often described as using or being based on images captured using one or more cameras 104*a*, other types of sensors 104 may be used to provide sensor data for use by these functions. For example, abstracted image representations or pseudo-image representations of RADAR or LIDAR measurements may be processed as described above to identify vanishing points, perform symmetry-based boundary refinement, and/or engage in component detection.

Also note that while bounding boxes are often described above as being generated, refined, processed, or otherwise used to represent the boundaries of objects, these boundaries may be expressed in any other suitable manner. Example types of boundaries that may be defined and used in the various systems, techniques, and processes described above include two-dimensional bounding boxes, three-dimensional cuboids, and/or boundaries around recognized objects (such as bridges, buildings, trees, light poles or other poles, traffic signs, traffic lights, etc.).

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining, using at least one processing device, image data associated with a scene;
identifying, using the at least one processing device, multiple line segments based on the image data;
identifying, using the at least one processing device, one or more boundaries around one or more objects detected in the image data;
estimating, using the at least one processing device, a position of a vanishing point associated with the image data based on multiple collections of the line segments while excluding, from the multiple collections, one or more of the line segments that overlap with or that are included within the one or more boundaries, wherein the estimated position of the vanishing point represents a weighted combination of estimated crossing points;
identifying at least one action to be performed based on the vanishing point; and
performing the at least one action.

2. The method of claim 1, wherein estimating the position of the vanishing point comprises:
for each collection, estimating a crossing point of the line segments in the collection and a residual associated with the estimated crossing point; and
generating the weighted combination of the estimated crossing points while using the residuals as weights for the estimated crossing points.

3. The method of claim 2, wherein the crossing point of the line segments in each collection is estimated using a least squares calculation.

4. The method of claim 1, further comprising:
identifying a reference horizon using the image data; and
identifying the line segments included in each of the multiple collections, each collection including line segments positioned below the reference horizon.

5. The method of claim 1, wherein the one or more boundaries comprise at least one of:
one or more two-dimensional bounding boxes;
one or more three-dimensional cuboids; and one or more boundaries around one or more recognized objects.

6. The method of claim 1, further comprising:
refining at least one of the one or more boundaries to identify one or more specific portions of the one or more objects based on the vanishing point.

7. The method of claim 6, further comprising:
identifying one or more components of at least one of the one or more objects based on at least one of the one or more refined boundaries.

8. The method of claim 1, wherein the line segments are associated with at least one of: one or more lines painted on at least one surface, one or more man-made structures, one or more road curbs, or one or more urban poles.

9. The method of claim 1, wherein the at least one action comprises at least one of:
an adjustment to at least one of: a steering of a vehicle, a speed of the vehicle, an acceleration of the vehicle, and a braking of the vehicle; and
an activation of an audible, visible, or haptic warning.

10. An apparatus comprising:
at least one processing device configured to:
obtain image data associated with a scene;
identify multiple line segments based on the image data;
identify one or more boundaries around one or more objects detected in the image data;
estimate a position of a vanishing point associated with the image data based on multiple collections of the line segments while excluding, from the multiple collections, one or more of the line segments that overlap with or that are included within the one or more boundaries, wherein the estimated position of the vanishing point represents a weighted combination of estimated crossing points;
identify at least one action to be performed based on the vanishing point; and
perform the at least one action.

11. The apparatus of claim 10, wherein, to estimate the position of the vanishing point, the at least one processing device is configured to:
for each collection, estimate a crossing point of the line segments in the collection and a residual associated with the estimated crossing point; and
generate the weighted combination of the estimated crossing points while using the residuals as weights for the estimated crossing points.

12. The apparatus of claim 11, wherein the at least one processing device is configured to estimate the crossing point of the line segments in each collection using a least squares calculation.

13. The apparatus of claim 10, wherein the at least one processing device is further configured to:
identify a reference horizon using the image data; and
identify the line segments included in each of the multiple collections, each collection including line segments positioned below the reference horizon.

14. The apparatus of claim 10, wherein the one or more boundaries comprise at least one of:
one or more two-dimensional bounding boxes;
one or more three-dimensional cuboids; and
one or more boundaries around one or more recognized objects.

15. The apparatus of claim 10, wherein the at least one processing device is further configured to refine at least one of the one or more boundaries to identify one or more specific portions of the one or more objects based on the vanishing point.

16. The apparatus of claim 15, wherein the at least one processing device is further configured to identify one or more components of at least one of the one or more objects based on at least one of the one or more refined boundaries.

17. The apparatus of claim 10, wherein the line segments are associated with at least one of: one or more lines painted on at least one surface, one or more man-made structures, one or more road curbs, or one or more urban poles.

18. The apparatus of claim 10, wherein the at least one action comprises at least one of:
an adjustment to at least one of: a steering of a vehicle, a speed of the vehicle, an acceleration of the vehicle, and a braking of the vehicle; and
an activation of an audible, visible, or haptic warning.

19. A non-transitory machine-readable medium containing instructions that when executed cause at least one processor to:
obtain image data associated with a scene;
identify multiple line segments based on the image data;
identify one or more boundaries around one or more objects detected in the image data;
estimate a position of a vanishing point associated with the image data based on multiple collections of the line segments while excluding, from the multiple collections, one or more of the line segments that overlap with or that are included within the one or more boundaries, wherein the estimated position of the vanishing point represents a weighted combination of estimated crossing points;
identify at least one action to be performed based on the vanishing point; and
perform the at least one action.

20. The non-transitory machine-readable medium of claim 19, wherein the instructions that when executed cause the at least one processor to estimate the position of the vanishing point comprise instructions that when executed cause the at least one processor to:
for each collection, estimate a crossing point of the line segments in the collection and a residual associated with the estimated crossing point; and
generate the weighted combination of the estimated crossing points while using the residuals as weights for the estimated crossing points.

21. The non-transitory machine-readable medium of claim 20, wherein the instructions cause the at least one processor to estimate the crossing point of the line segments in each collection using a least squares calculation.

22. The non-transitory machine-readable medium of claim 19, wherein the instructions when executed further cause the at least one processor to:
identify a reference horizon using the image data; and
identify the line segments included in each of the multiple collections, each collection including line segments positioned below the reference horizon.

23. The non-transitory machine-readable medium of claim 19, wherein the one or more boundaries comprise at least one of:
one or more two-dimensional bounding boxes;
one or more three-dimensional cuboids; and
one or more boundaries around one or more recognized objects.

24. The non-transitory machine-readable medium of claim 19, wherein the instructions when executed further cause the at least one processor to refine at least one of the one or more boundaries to identify one or more specific portions of the one or more objects based on the vanishing point.

25. The non-transitory machine-readable medium of claim 24, wherein the instructions when executed further cause the at least one processor to identify one or more components of at least one of the one or more objects based on at least one of the one or more refined boundaries.

26. The non-transitory machine-readable medium of claim 19, wherein the line segments are associated with at least one of: one or more lines painted on at least one surface, one or more man-made structures, one or more road curbs, or one or more urban poles.

27. The non-transitory machine-readable medium of claim 19, wherein the at least one action comprises at least one of:
    an adjustment to at least one of: a steering of a vehicle, a speed of the vehicle, an acceleration of the vehicle, and a braking of the vehicle; and
    an activation of an audible, visible, or haptic warning.

\* \* \* \* \*